US006655702B2

(12) United States Patent  (10) Patent No.: US 6,655,702 B2
Senger  (45) Date of Patent: Dec. 2, 2003

(54) COMBINATION VEHICLE PASSENGER SEAT/CHILD STROLLER

(75) Inventor: Marc Senger, Southfield, MI (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 10/047,848

(22) Filed: Jan. 15, 2002

(65) Prior Publication Data
US 2003/0132588 A1 Jul. 17, 2003

(51) Int. Cl.⁷ ................................................ B62B 7/12
(52) U.S. Cl. ...................... 280/30; 297/238; 296/65.01; 296/65.03; 280/643
(58) Field of Search ............................. 297/238, 250.1, 297/256.16, 254; 296/63, 64, 65.01, 68, 65.03, 65.04, 65.09, 69; 280/30, 642, 643, 647, 648, 649, 650, 657, 658, 47.38, 47.41

(56) References Cited

U.S. PATENT DOCUMENTS

| | | | | |
|---|---|---|---|---|
| 3,193,326 A | * | 7/1965 | Smith | 297/257 |
| 3,944,241 A | * | 3/1976 | Epelbaum | 280/30 |
| 4,198,091 A | * | 4/1980 | Appleton | 296/63 |
| 4,230,366 A | | 10/1980 | Ruda | |
| 4,341,422 A | | 7/1982 | Cunningham | |
| 4,655,503 A | | 4/1987 | Kamijo et al. | |
| 4,679,804 A | * | 7/1987 | Johnson | 280/30 |
| 4,685,688 A | | 8/1987 | Edwards | |
| 4,762,331 A | * | 8/1988 | Tucker et al. | 280/30 |
| 4,828,281 A | * | 5/1989 | Sanchas | 280/30 |
| D302,410 S | | 7/1989 | Tucker et al. | |
| 4,872,693 A | * | 10/1989 | Kennel | 280/30 |
| 4,874,182 A | * | 10/1989 | Clark | 280/30 |
| 4,878,680 A | * | 11/1989 | Molnar | 280/30 |
| 4,896,894 A | * | 1/1990 | Singletary | 280/30 |
| 4,902,026 A | * | 2/1990 | Maldonado | 280/30 |
| 4,902,070 A | * | 2/1990 | Casale et al. | 297/238 |
| 4,936,627 A | * | 6/1990 | Guim | 297/238 |
| 4,943,112 A | | 7/1990 | Law | |
| 4,989,888 A | * | 2/1991 | Qureshi et al. | 280/30 |
| 5,022,669 A | * | 6/1991 | Johnson | 280/30 |
| 5,149,113 A | * | 9/1992 | Alldredge | 280/30 |
| 5,161,855 A | * | 11/1992 | Harmon | 297/238 |
| 5,230,523 A | * | 7/1993 | Wilhelm | 280/30 |
| 5,282,667 A | * | 2/1994 | Elton et al. | 297/238 |
| 5,294,182 A | | 3/1994 | Colasanti | |
| 5,318,311 A | * | 6/1994 | Bofill | 280/30 |
| 5,372,398 A | * | 12/1994 | Aneiros et al. | 296/65.03 |

(List continued on next page.)

Primary Examiner—Brian L. Johnson
Assistant Examiner—Kelly E Campbell
(74) Attorney, Agent, or Firm—Welsh & Katz, Ltd.

(57) ABSTRACT

A combination vehicle passenger seat/child stroller apparatus is adapted to be releasably secured to floor-board seat tracks of a vehicle. The apparatus is selectively convertible between a stroller mode for use outside the vehicle and a seat mode for supporting an adult or child passenger inside the vehicle. The apparatus includes an upright body portion and a corresponding first cushion, a bottom body portion and a corresponding second cushion, where the bottom body portion is operatively coupled to the upright body portion. Also included are front wheels and rear wheels, and front arms and rear arms each having proximal and distal ends. The distal ends of the front arms are operatively connected to the front wheels, and the distal ends of the rear arms operatively connected to the rear wheels. The proximal ends of the arms are pivotally connected to either the upright body portion or the bottom body portion. The front and rear arms are configured to pivot and fold inwardly such that in the seat mode, either the front arms or rear arms secure the apparatus to the seat tracks of the vehicle. When in stroller mode, the front and rear arms are configured to pivot and extend outwardly.

19 Claims, 16 Drawing Sheets

U.S. PATENT DOCUMENTS

| | | | |
|---|---|---|---|
| 5,380,060 A | * | 1/1995 | Sponsler et al. ............. 297/238 |
| 5,398,951 A | | 3/1995 | Ryu |
| 5,403,068 A | * | 4/1995 | Fatchett ...................... 297/238 |
| D361,743 S | | 8/1995 | Matsumoto et al. |
| 5,449,216 A | * | 9/1995 | Gierman et al. ........ 297/216.11 |
| 5,474,311 A | * | 12/1995 | Tyciak et al. .................. 280/30 |
| 5,547,242 A | * | 8/1996 | Dukatz et al. ............ 296/65.03 |
| 5,551,750 A | | 9/1996 | Yoshimura |
| 5,568,959 A | * | 10/1996 | Weber et al. ................ 297/238 |
| 5,639,144 A | * | 6/1997 | Naujokas .................... 297/238 |
| 5,816,650 A | | 10/1998 | Lucas, Jr. |
| 5,823,547 A | | 10/1998 | Otobe et al. |
| 5,911,465 A | * | 6/1999 | Yamamoto et al. ....... 296/65.03 |
| 6,036,252 A | * | 3/2000 | Hecksel et al. ........... 296/65.03 |
| 6,056,346 A | * | 5/2000 | Smuk ....................... 296/65.03 |
| 6,161,896 A | | 12/2000 | Johnson et al. |
| 6,196,611 B1 | | 3/2001 | Lee |
| 6,220,665 B1 | * | 4/2001 | Dingel et al. ................ 297/326 |
| 6,264,261 B1 | | 7/2001 | Krafcik |
| 6,367,821 B2 | * | 4/2002 | Thiele ......................... 280/30 |
| 6,386,614 B1 | * | 5/2002 | Logan ..................... 296/65.03 |
| 6,449,786 B1 | * | 9/2002 | Voit ............................ 5/200.1 |

* cited by examiner

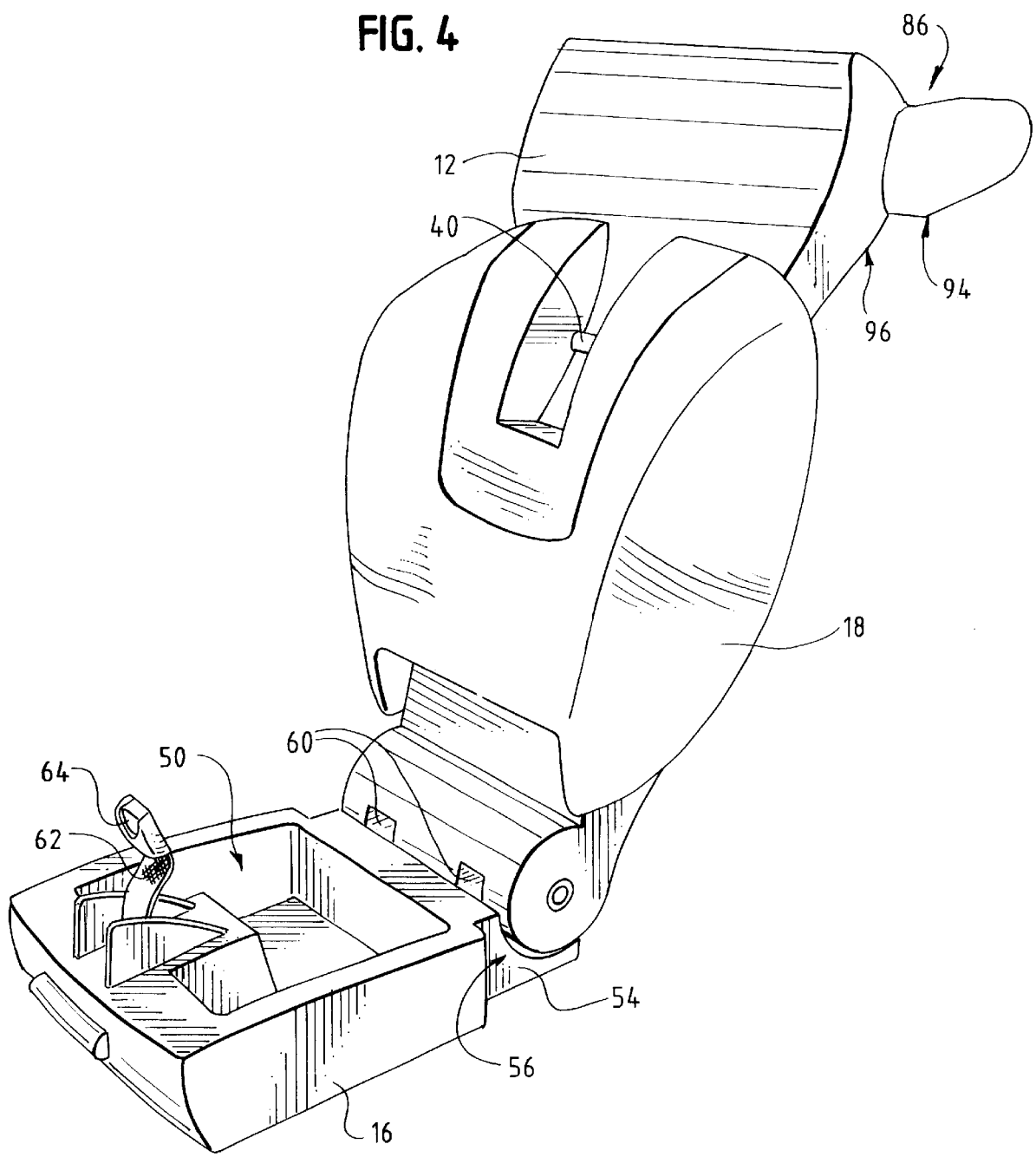

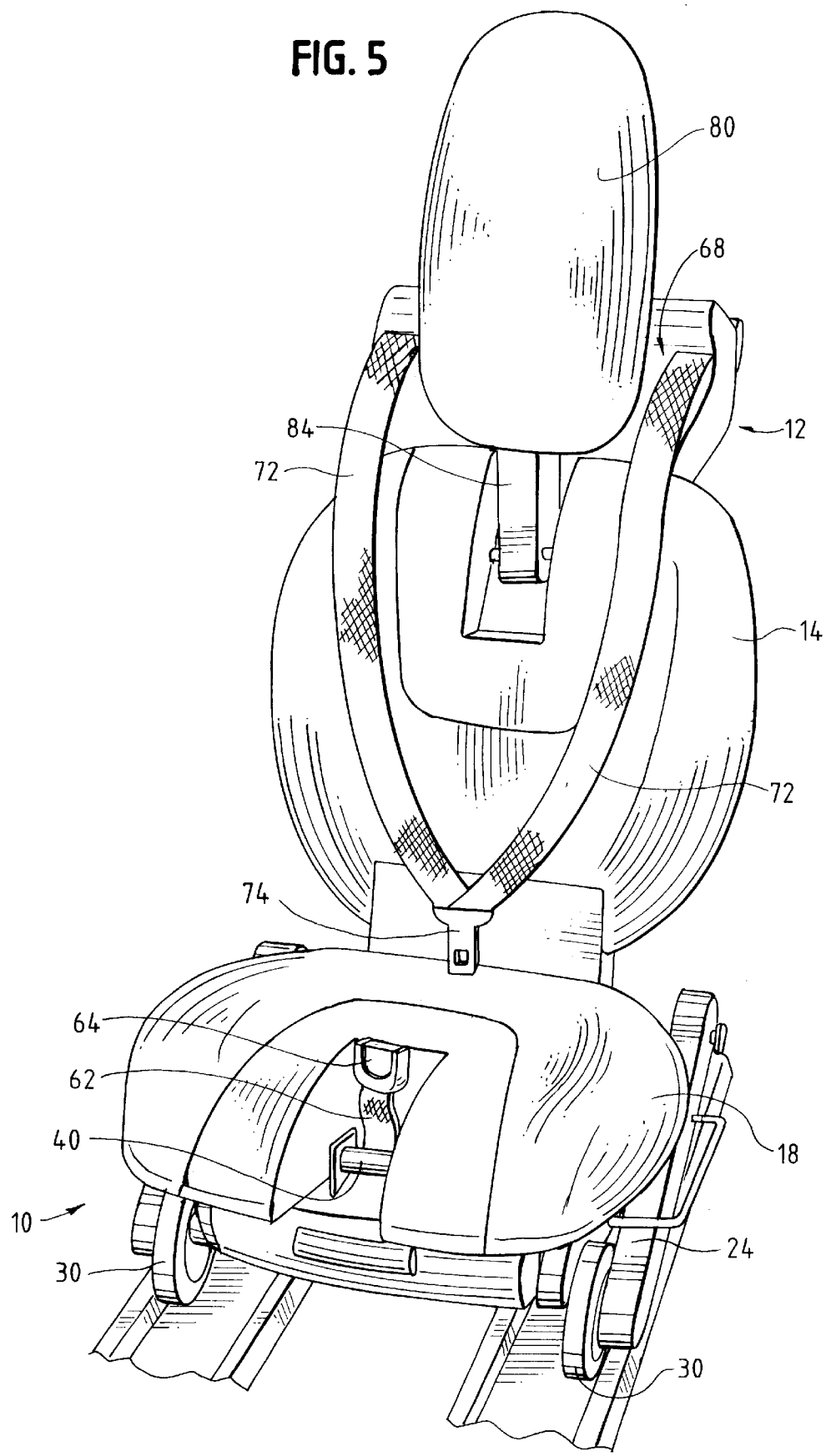

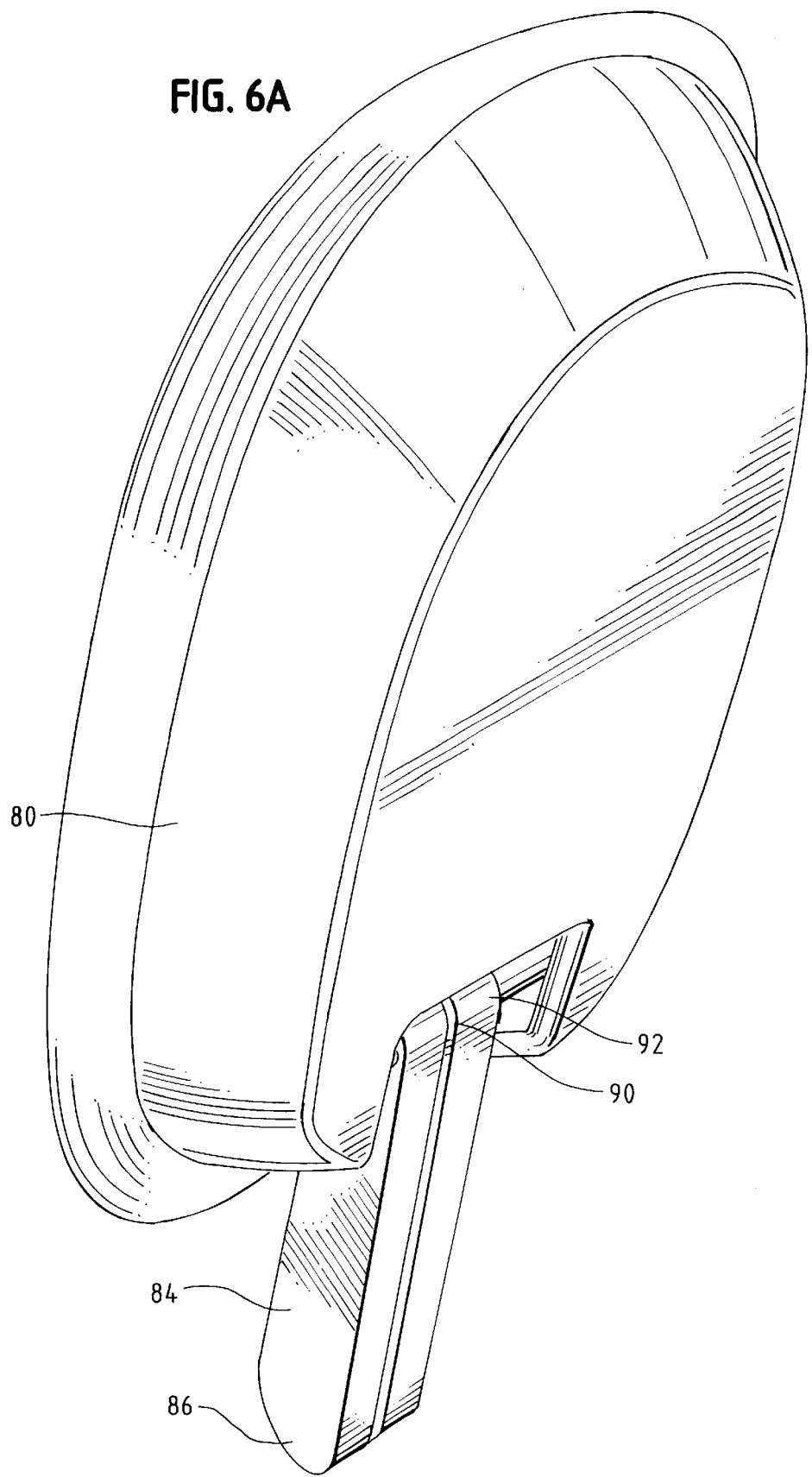

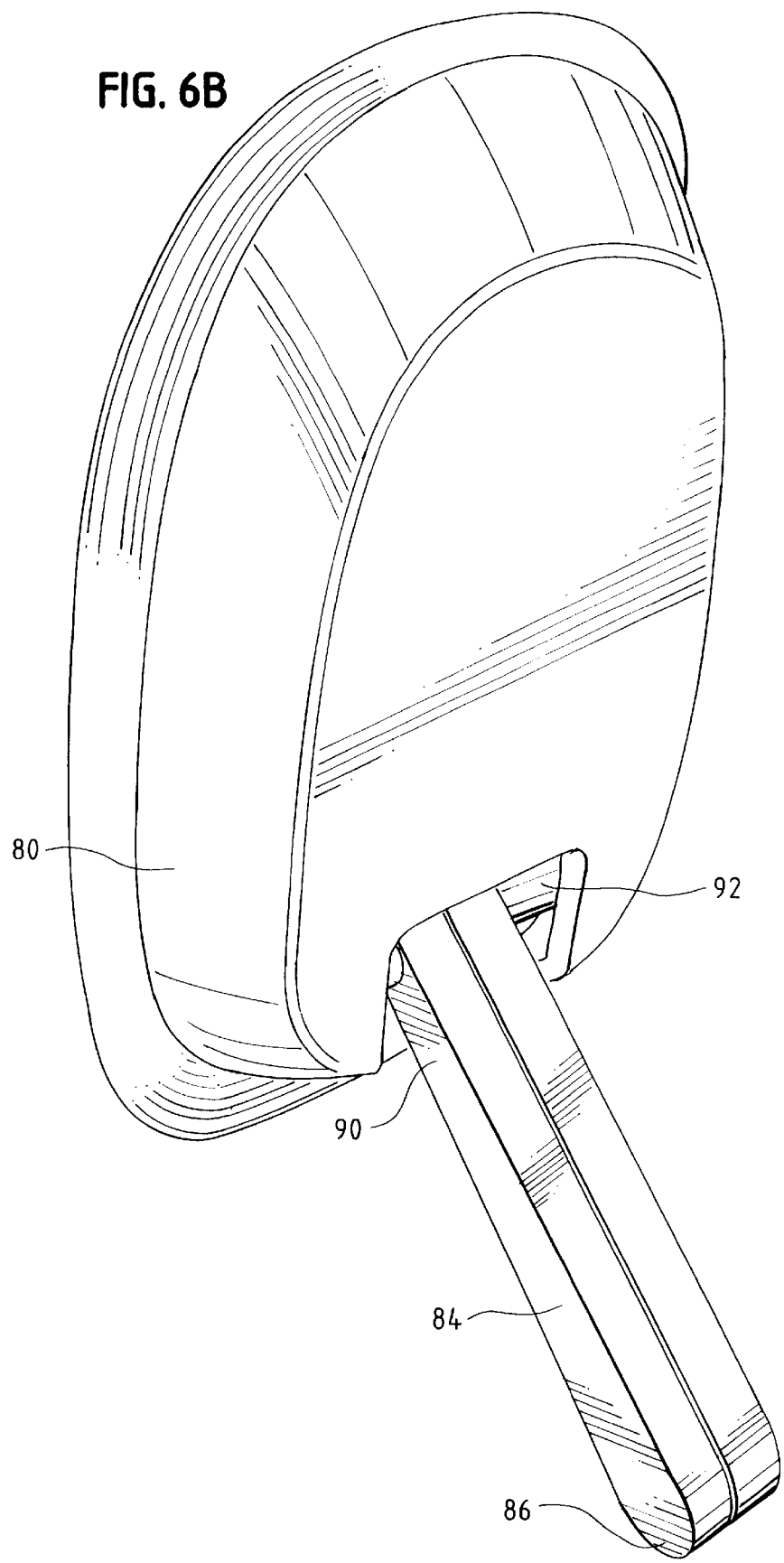

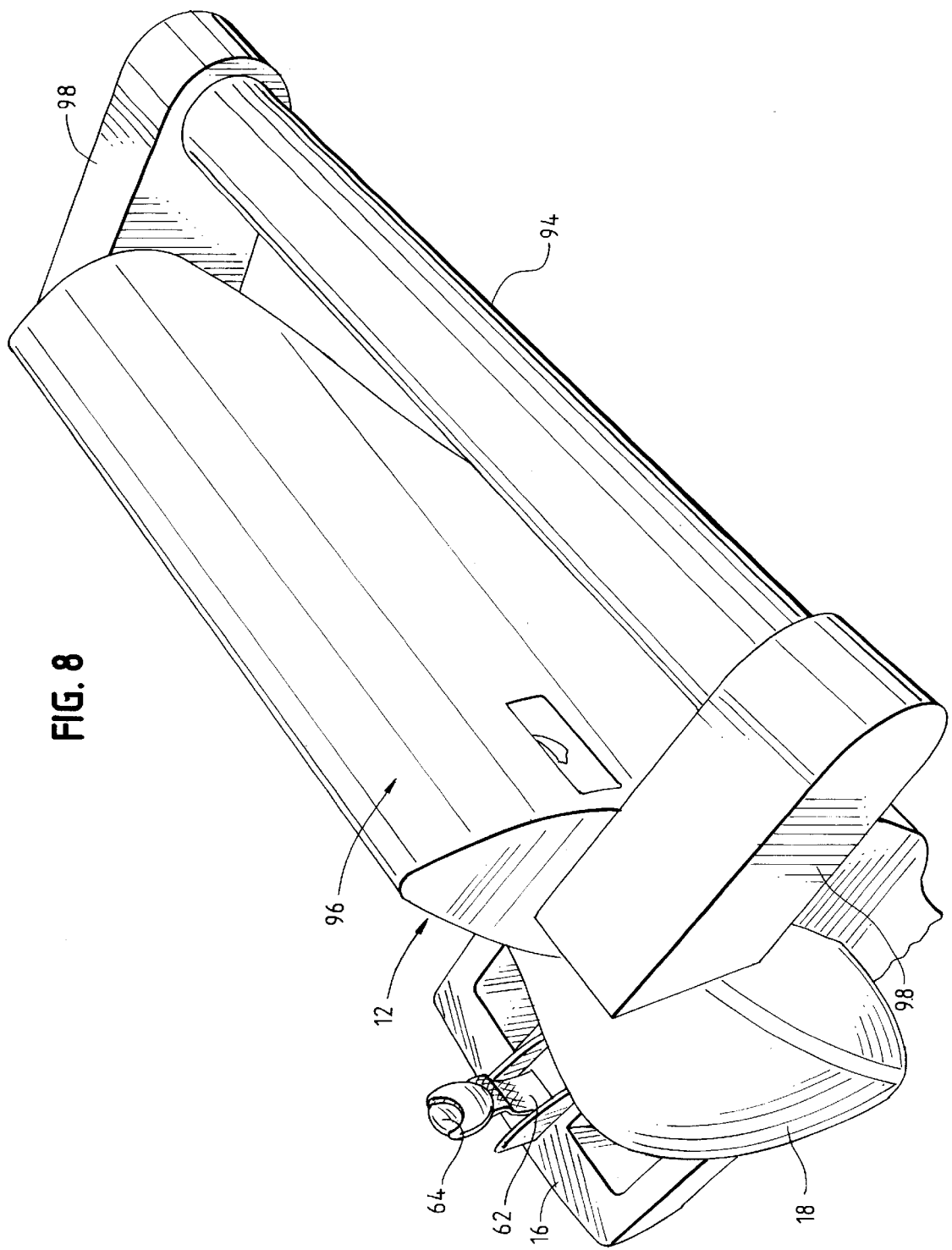

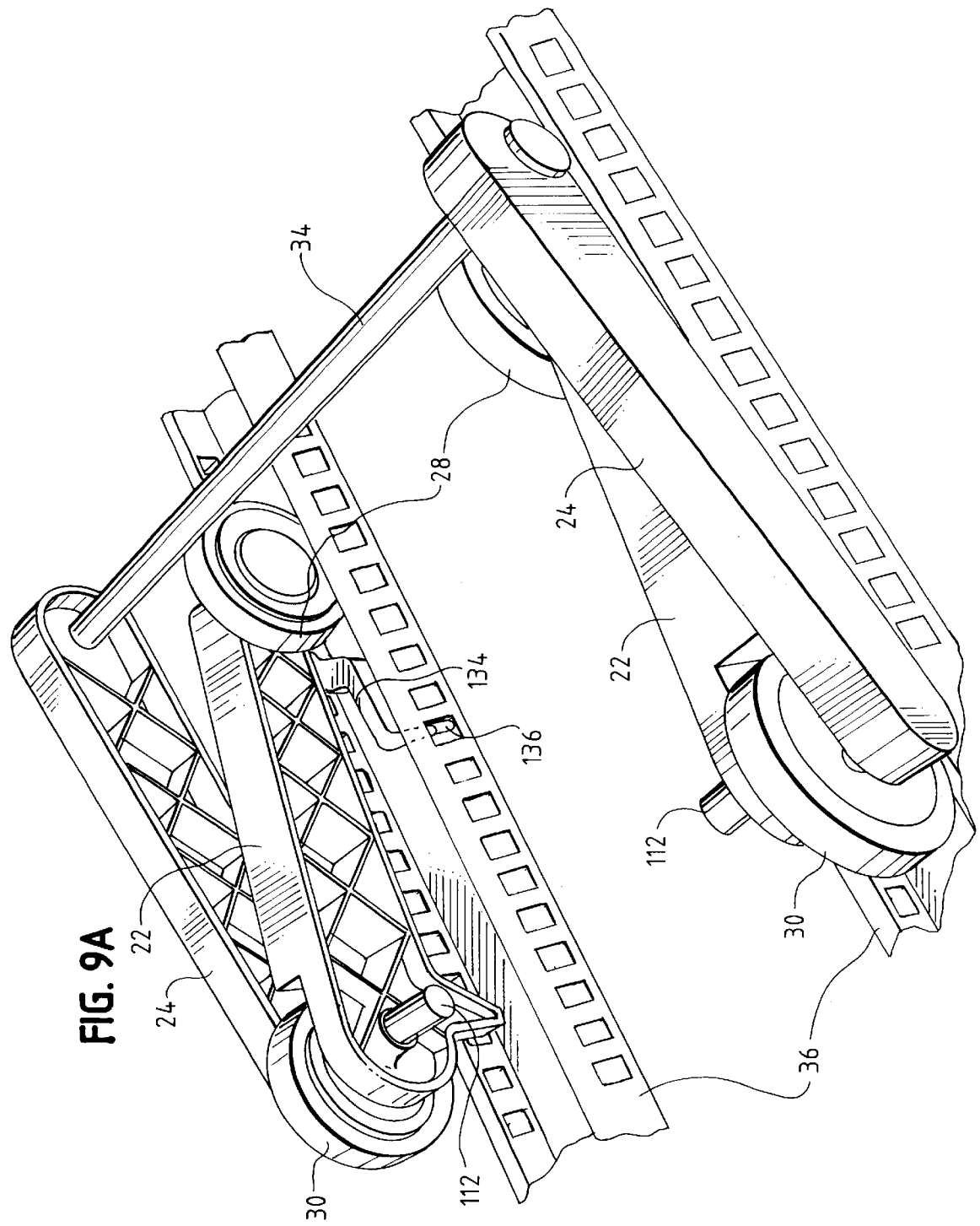

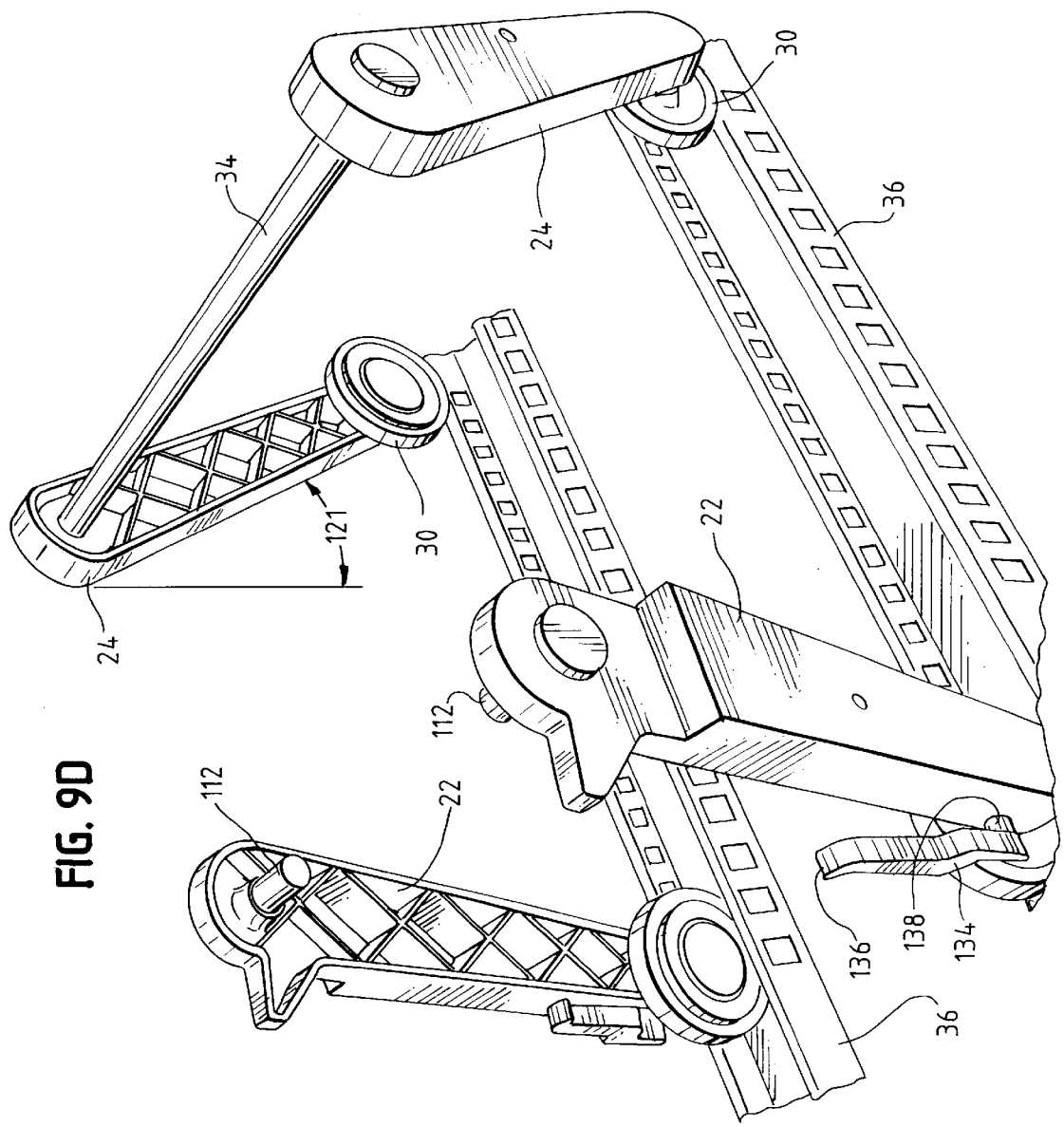

COMBINATION VEHICLE PASSENGER SEAT/CHILD STROLLER

FIELD OF THE INVENTION

The present invention relates generally to a vehicle seat, and more specifically to a combination stroller and adult/child seat for a vehicle.

BACKGROUND

Various child restraint seats for vehicles have been proposed. Some known child seats are attached directly to the existing vehicle seat by straps or other connectors. Other known child seats have folding wheels that swing down so that the seat may be used as a stroller, which stroller is disclosed in U.S. Pat. No. 4,989,888 issued to Qureshi et al. Such a combination child seat/stroller, however, is used in addition to the existing car seat and is cumbersome to install and uninstall. Additionally, such combination car seats are relatively costly to produce and must be purchased separately and are generally not offered as an "option" by the vehicle manufacturer or dealer.

Such known child seats, although effective, suffer some notable drawbacks. First, the seat may not be properly secured by the parent or other adult. This can result in the failure of the car seat to protect the child. Second, the seat, when not needed, must be removed and stored elsewhere. Apart from being inconvenient, this situation leads to the temptation not to use the child seat. Also, the seat can be lost or otherwise unlocatable, and thus be inaccessible when needed. Accordingly, the child would be either prevented from traveling in the car or be placed in a high-risk situation.

Another type of car seat relates those built into or otherwise formed as a part of the existing automobile seat. This type of seat is built such that a child can be seated safely in the automobile by folding downwardly or otherwise moving a cross member associated with the seat over the child. One example of such built-in seat restraints is disclosed in U.S. Pat. No. 4,230,366 issued Oct. 28, 1980 to Ruda. The Ruda reference teaches a passive child restraint which is built into the rear bench seat of an automobile. The U-shaped member is disposed around the child so that the child has both his or her lateral and forward movement restricted. The U-shaped restraint member may be rotated, lifted or pulled into position around the child.

Another seat of this type is disclosed in U.S. Pat. No. 4,341,422 issued Jul. 27, 1982 to Cunningham, and is entitled "Restraint Device." The Cunningham reference teaches a child restraint device that alternatively serves as a headrest for an adult. The restraint device comprises a deformable rigid foam member having a convexo-concavo surface. The foam member is secured to the top portion of a seat back. When an infant is seated on the car seat, the foam member may be removed from the top of the seat and placed on the child's lap. The foam member is then secured thereto by the car seat belt. The foam member is lowered into position via webs wound around and extendable from retractor wheels. When mounted atop the car seat, the foam member encompasses and hides the webs and retractor wheels.

Still another seat is described in U.S. Pat. No. 4,943,112 issued Jul. 24, 1990 to Law for a "Child's Collapsible Car Seat." The Law reference teaches a child's car seat that is built into an adult car seat. The seatback is pulled down and rests horizontally upon the lower portion of the seat. The seatback then forms the lower portion of the child seat. The headrest is then rotated forwardly and downwardly, securing the child therein. The back of the child car seat is defined by the newly exposed area to which the lower portion had previously been secured.

The above-described car seats, however, cannot be converted into a child stroller while also being configured to accommodate either an adult or child in the seat. A need exists for "stock" car seat adapted for use by an adult or child that can be converted into a stroller for use outside the vehicle.

SUMMARY

The disadvantages of present vehicle seats are substantially overcome with the present invention by providing a novel combination vehicle passenger seat/child stroller apparatus adapted to be releasably secured to existing floorboard seat tracks of a vehicle. The apparatus is selectively convertible between a stroller mode for use outside the vehicle and a seat mode for supporting an adult or child passenger inside the vehicle. More specifically, one embodiment of the present invention includes an upright body portion and a corresponding first cushion, a bottom body portion and a corresponding second cushion, where the bottom body portion is operatively coupled to the upright body portion. Also included are front wheels and rear wheels, and front arms and rear arms each having proximal and distal ends. The distal ends of the front arms are operatively connected to the front wheels, and the distal ends of the rear arms operatively connected to the rear wheels. The proximal ends of the arms are pivotally connected to either the upright body portion or the bottom body portion. The front and rear arms are configured to pivot and fold inwardly such that in the seat mode, either the front arms or the rear arms secure the apparatus to the seat tracks of the vehicle via a hook or latch mechanism. When in stroller mode, the front and rear arms are configured to pivot and extend outwardly.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

FIG. 4 is a perspective view of a specific embodiment of the bottom body portion showing a seat buckle mounting;

FIG. 5 is a perspective view of a specific embodiment of the apparatus particularly showing the seat belt mechanism;

FIGS. 6A–6C show perspective views of a specific embodiment of the pivoting cushion in operation;

FIG. 8 shows a perspective view of a specific embodiment of a handle attached to an upright body portion;

FIGS. 9A–9D show perspective views of a specific embodiment of the front and rear arms;

DETAILED DESCRIPTION

In this written description, the use of the disjunctive is intended to include the conjunctive. The use of definite or indefinite articles in not intended to indicate cardinality. In particular, a reference to "the" object or thing or "an" object or "a" thing is intended to also describe a plurality of such objects or things.

Figure 1:
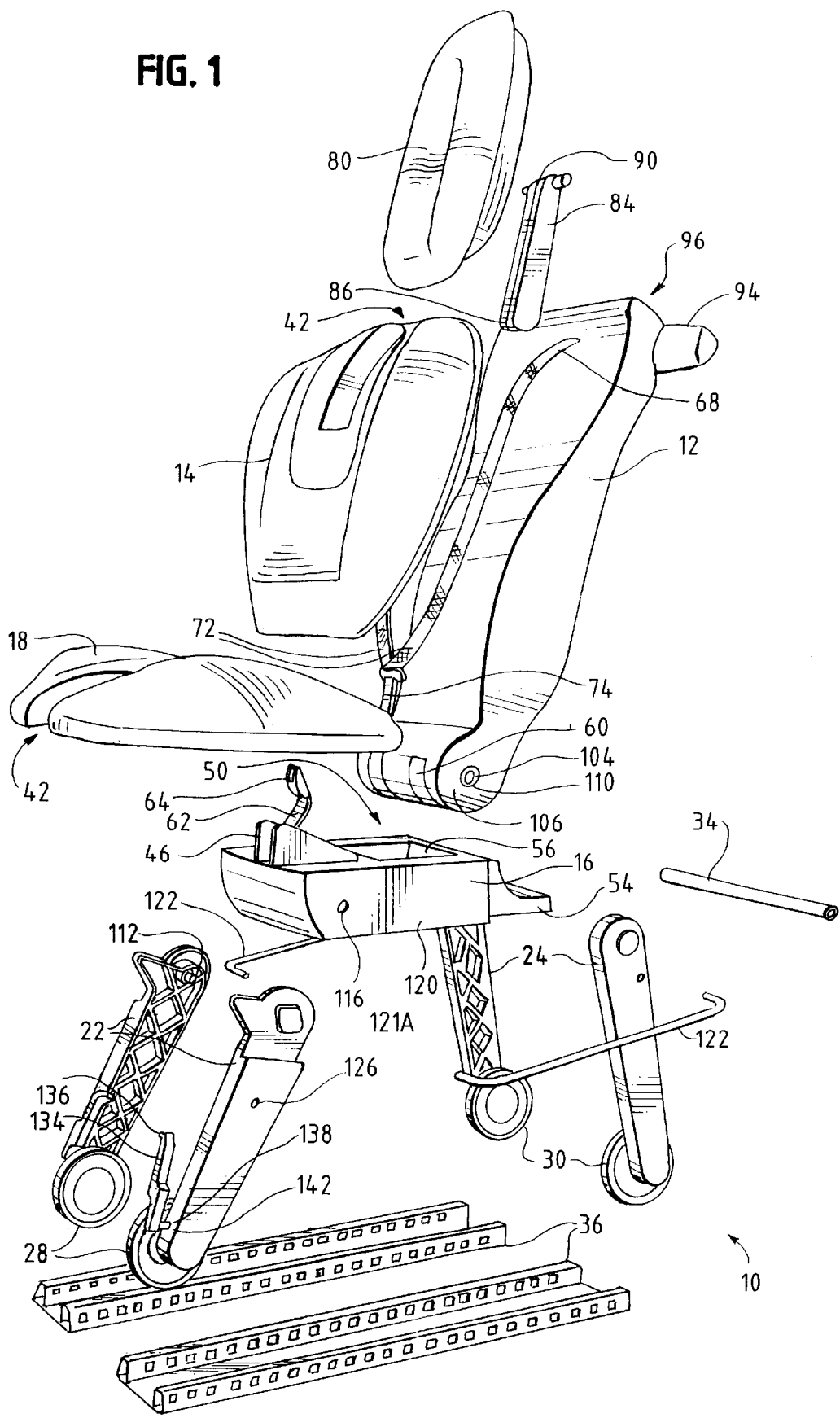
FIG. 1 is an exploded perspective view of a specific embodiment of a combination vehicle seat/child stroller according to the present invention.
Figure 2:
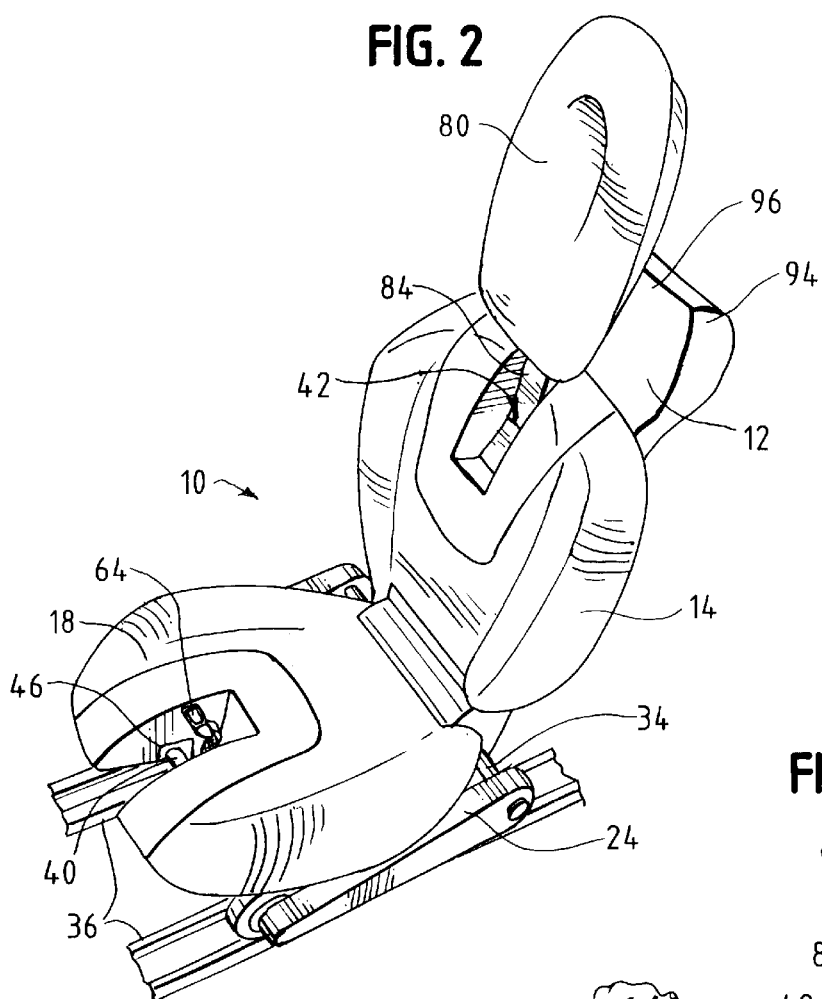
FIG. 2 is a perspective view of the combination vehicle seat/child stroller of FIG. 1.
Figure 3:
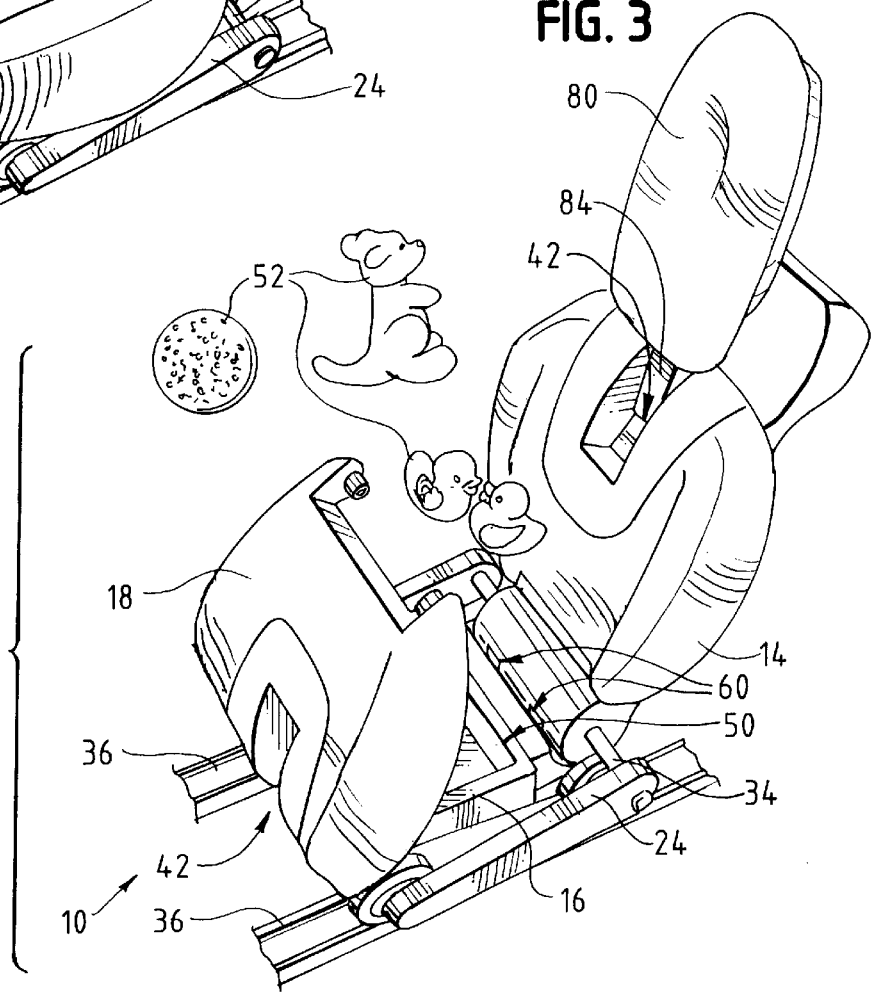
FIG. 3 is a specific embodiment of a perspective view of the combination vehicle seat/child stroller of FIG. 1 showing the bottom cushion in a lifted position.

Referring now to FIGS. 1–3, a combination vehicle seat/child stroller apparatus 10 is shown generally. The vehicle seat/child stroller apparatus 10 includes a generally upright body portion 12, a first or back cushion 14 disposed adjacent to the upright body portion, a bottom body portion 16, and a second or bottom cushion 18 disposed on top of the bottom body portion.

Also included are a pair of front arms 22 and rear arms 24 (also referred to as front and rear struts, respectively), the distal ends of which may be coupled to corresponding front wheels 28 and rear wheels 30, respectively. Proximal ends of the rear arms 24 may be coupled to the upright body portion 12 by an axle or fastening rod 34, while proximal ends of the front arms 22 are preferably coupled to the bottom body portion 16. The front arms 22 and/or the rear arms 24 are configured to fasten the vehicle seat/child stroller 10 to existing floor board seat tracks 36 of the vehicle.

In one specific embodiment, the front and rear 22, 24 arms and associated front and rear wheels 28, 30 are preferably made of a composite, non-corrosive material such as plastic, acrylonitrile butadyne styrene (ABS), high density polyethylene (HDPE), and the like, which has been injection molded, or other high-impact plastic, such as, for example PCABS (polycarbonate mixed with acrylonitrile-butadine-styrene), polycarbonate or other hard plastic, as is known in the art. Alternatively, the arms 22 and 24 may be made of thin-wall metal tubing which has been plated for corrosion resistance.

The upright body portion 12 and the bottom body portion 16, in one specific embodiment, may be made from foam material, such as polyethylene. The body portions 12 and 16 may be made in an injection molding process or may be blow-molded, as is known in the art.

The back cushion 14 and the bottom cushion 18 are preferable made of foam material, such as polyethylene, as is known in the art. The cushions 14 and 18 may also be made using an injection molding process.

Note that the back cushion 14 and the bottom cushion 18 are identical in all respects. Accordingly, they may be interchanged. This reduces the cost of the apparatus 10 by lowering the number of parts that must be stocked and manufactured. The back cushion 14 may be permanently fastened to the upright body portion 12 using a suitable chemical adhesive, or may be releasably mounted using cone-shaped connectors having retracting fins, commonly known as "Christmas tree" connectors because of their appearance, as is known in the art.

Preferably, the bottom cushion 18 may include a bottom cushion hinge pin 40, which spans a wide seat channel 42 disposed in the forward portion of the bottom cushion. The seat channel 42 extends for about fifty percent of the length of the bottom cushion 18. Note that the back cushion 14 also includes the wide seat channel 42, as it is identical to the bottom cushion 18. The hinge pin 40 may be molded into the bottom cushion 18 or may be fastened using suitable brackets, as is known in the art. The bottom cushion hinge pin 40 mates with a bottom seat hook 46 disposed on the bottom body portion 16, which is best shown in FIG. 2. The bottom seat hook 46 may be curved or semi-cylindrical and is configured to permit the bottom seat cushion 18 pivot about the bottom cushion hinge pin 40. As shown in FIG. 3, slight upward pressure on the back edge of the bottom seat cushion preferably causes the bottom seat cushion 18 to lift and pivot about the bottom cushion hinge pin 40. The bottom seat cushion 18 preferably need not be locked down to the bottom body portion 16 because the weight of the passenger will retain the bottom cushion in place.

As shown in FIGS. 1 and 3, the bottom body portion 16 is hollow and includes an open end 50 configured to be releasably covered by the bottom cushion 18 so as to define a chamber for storage of articles 52. This provides a convenience to the user by permitting the various articles 52, such as children's toys, to be stowed neatly and safely.

As best shown in FIG. 4, the bottom body portion 16 has a molded lip 54 that extends from a rear sidewall 56 of the bottom body portion. The molded lip 54 permits positive coupling between the upright body portion 12 and the bottom body portion 16. For passenger comfort, in the illustrated embodiment, the upright body portion 12 may pivot relative to the bottom body portion 16. For example, several "detent" positions may be available to permit the passenger to move the upright body portion 12 into a more reclined position, which may, for example range from ninety degrees (fully upright position) to about one-hundred and thirty-five degrees (fully reclined position), as is known in the art.

Although the upright body portion 12 may pivot relative to the bottom body portion 18, the two portions are positively coupled together and remain locked together, even while being intentionally pivoted by the passenger. This is important so as to provide a stable platform and to prevent seat collapse during a crash. Accordingly, as best shown in FIGS. 3 and 4, a positive engagement or detented hinge 60 connects the upright body portion 12 with the bottom body portion 16. Of course, any suitable connection mechanism may be used to assure the structural integrity of the body portions 12 and 16, as is known in the art.

Referring now to FIGS. 1, 2, 4, and 5, FIG. 5 shows a seat buckle mounting 62 and seatbelt clasp 64 attached to the bottom body portion 16. The seat buckle mounting 62 and clasp 64 may be of a standard commercially available type, as is known in the art. Note that the seat buckle mounting 62 is accessible whether the bottom seat cushion 18 is in the "down" or seated position or in the up or "pivoted" position. The seat buckle clasp 64 mates with a seat belt assembly 68, most clearly shown in shown in FIG. 5. The seat belt assembly 68 may be attached to the upright body portion 12 and may include a fabric seat belt 72, a spring assisted reel mechanism (not shown), and a metal tongue 74. Rather than a typical "diagonal-type" or three-point hitch-type of seat belt, the seat belt assembly 68 is preferably a "V-type" seat belt assembly where two belt sections cross over the passenger's shoulders and fasten between the legs, which is similar to a pilot's seat belt in an aircraft. The seat belt assembly 68 may be a commercially available seat belt assembly, as is known in the art. In operation, the seat belt 72 is extended out and in front of the passenger, and the tongue 74 of the seat belt is inserted into the corresponding seat buckle clasp 64.

Note that the seat belt assembly 68 is self-contained, meaning that it is not attached to any other part of the vehicle, such as the vehicle pillars (not shown). The seat belt assembly 68 only attaches to seat/child stroller apparatus 10. The seat belt assembly 68 is self-contained because the seat belt 72 is configured to retain the child in the seat when the apparatus 10 is used as a child stroller external from the vehicle, as described below.

Referring back to FIGS. 1 and 6A–6C, FIGS. 6A–6C show an upper cushion 80 operatively coupled to the upright body portion 12 (FIGS. 1–3) by a moveable brace 84. A first end 86 of the moveable brace 84 is preferably fixed to the upright body portion 12 by conventional means, such as a hinge mount or other suitable pivoting means. In one embodiment, a second end 90 of the moveable brace 84 may be attached to the upper cushion 80 by a frictional hinge 92 so that the upper cushion may pivot relative to the second end of the moveable brace.

Figure 6C:
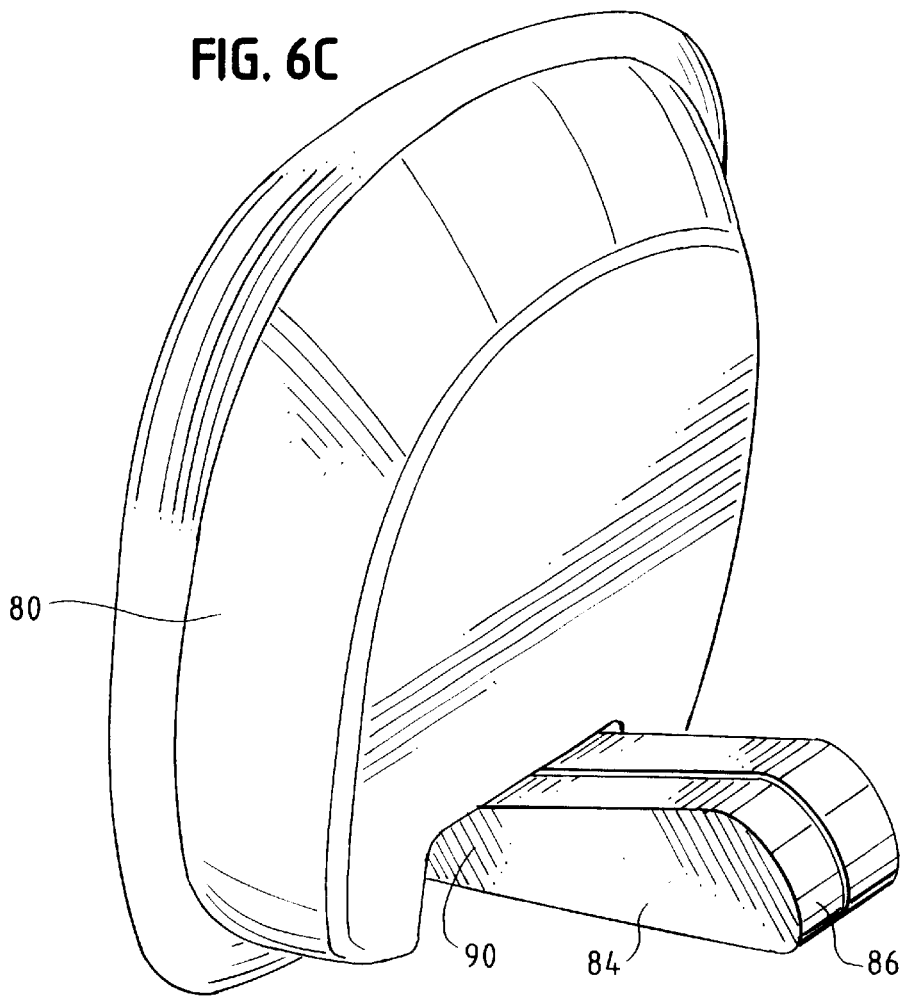
Figure 7A:
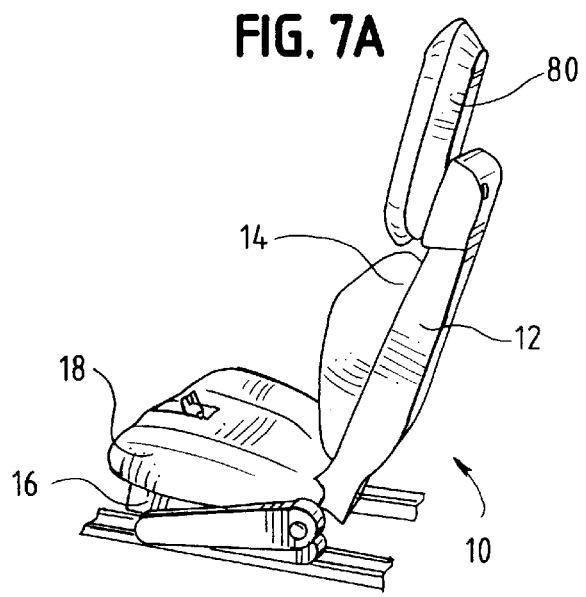
FIGS. 7A–7C show perspective views of a specific embodiment of the pivoting cushion of FIGS. 6A–6C in operation attached to the apparatus.
Figure 7B:
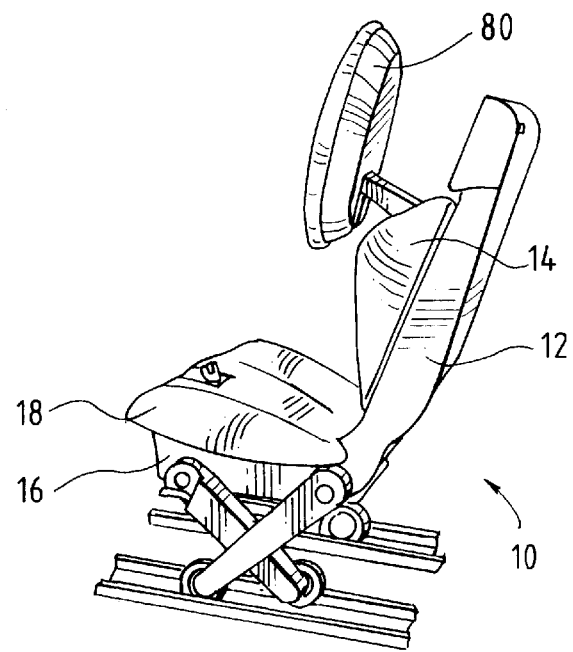
Figure 7C:
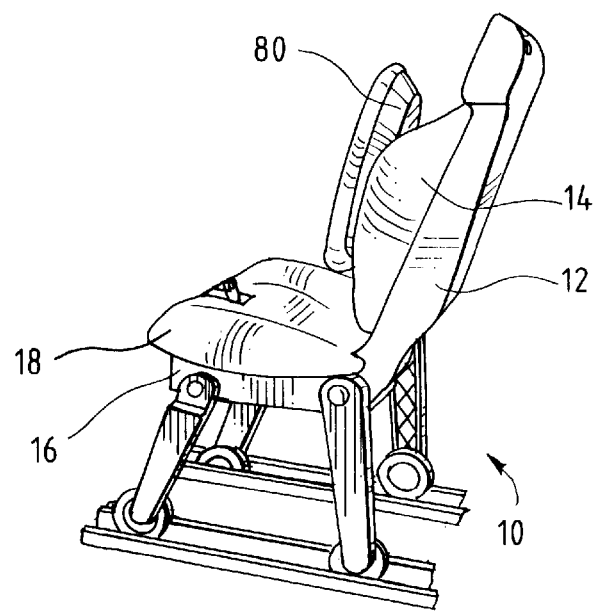

As shown in FIGS. 6A and 7A, the upper cushion 80 is shown pivoted in the upper position. In this configuration, the upper cushion 80 functions as a headrest so as to accommodate an adult passenger. As shown in FIGS. 6B and 7B, the upper cushion 80 is shown pivoting toward the lower position. As shown in FIGS. 6C and 7C, the upper cushion 80 is fully pivoted down to the lower position and functions as a backrest. When pivoted to the lower position, the upper cushion 80 is disposed in front of the back cushion 14 to increase an effective "thickness" of the back cushion so as to accommodate a child passenger. In this way, the child will be seated closer to the edge of the bottom cushion 18 and his or her back will be supported by the upper cushion 80 that has been pivoted downwardly.

Referring now to FIGS. 4 and 8, a handle 94 is shown attached to a back portion 96 of the upright body portion 12. The handle 94 may be attached by know means, such as bolts, screws, posts and the like, or may be molded as part of the upright body portion 12, and thus may be formed of the same material as the upright body portion. Alternately, the handle 94 may include lateral brackets 98 and a freely spinning cylindrical bar for user comfort. In either configuration, the handle 94 is used to push the apparatus 10 when operating as a stroller.

Figure 9B:
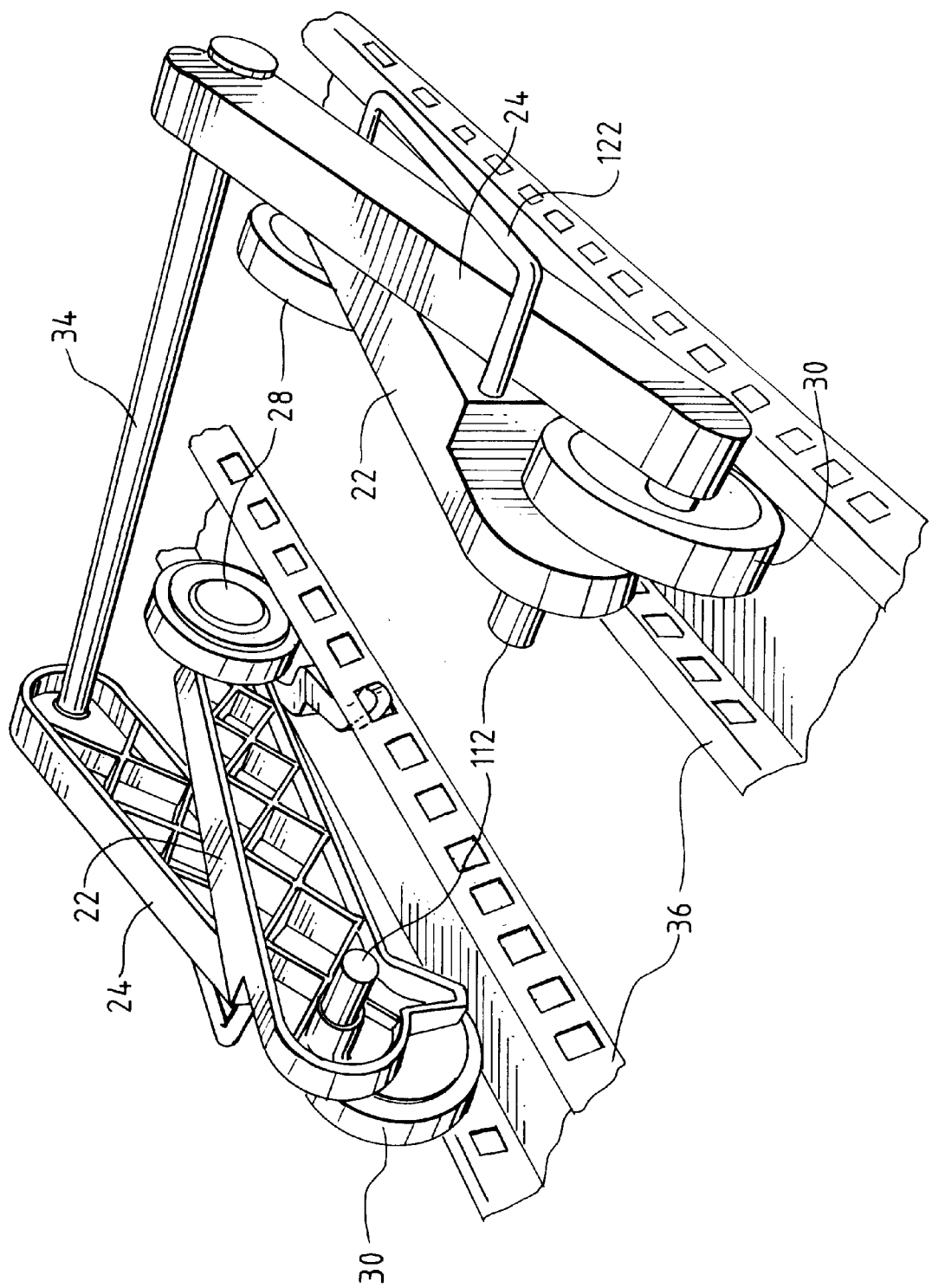

Referring now to FIGS. 1 and 9A–9D, FIGS. 9A–9D illustrate the front and rear arms 22, 24 and the corresponding wheels 28 and 30 without other components of the apparatus visible for purposes of clarity. Each figure shows sequential extension or unpivoting of the arms 22, 24 from a collapsed state shown in FIG. 9A (seat mode) to a fully extended state, as shown in FIG. 9D (stroller mode). As shown in FIG. 9A, the axle or connection bar 34 connects the rear arms 24 together. The axle 34 may be received through a corresponding throughbore 104 in a lower cylindrical portion 106 of the upright body portion 12, as best shown in FIG. 1. A hollow metal cylindrical sleeve 110 may be molded into the throughbore 104 SO as to receive the axle 34. Ends of the axle 34 may be threaded so as to receive a nut, thus securing each rear arm 24 to the axle.

To secure the forward arms 22, proximal ends of the front arms 22 include a post 112 that projects inwardly from interior portions of the front arms. The posts 112 are received within corresponding recesses 116 in sidewalls 120 of the bottom body portion 16, and may also be secured therein by suitable means, such as a nut, cotter pin, and the like. Alternatively, both the front arms 22 and the rear arms 24 may be secured to the lower body portion 16, either by posts the project into the bottom body portion 16 for a predetermined distance, or by an axle, which spans the width of the bottom body portion.

The sequence of figures beginning with FIG. 9A and ending with FIG. 9D show the position of the front and rear arms 22, 24 and corresponding wheels 28, 30 as the apparatus 10 moves from the seat mode (FIG. 9A) to the stroller mode (FIG. 9D). In operation, the user unlocks and lifts the apparatus 10 from the floor of the vehicle and pivots the front and rear arms 22, 24 toward the extended position for use as a stroller. Alternatively, the arms 22, 24 may be spring loaded such that depression of a "release" button causes the arms to extend.

As described above, FIG. 9A shows the apparatus 10 in the seat mode where the front and rear arms 22, 24 are fully pivoted and inwardly or "folded" substantially adjacent the floor-board seat tracks 36. Note that as shown in the specific illustrated embodiment of FIGS. 9A, 9C and 9D, the front wheels 28 fit within the width of the floor board seat tracks 36 while the rear wheels appear to ride just on top of the floor board seat tracks.

Figure 10:
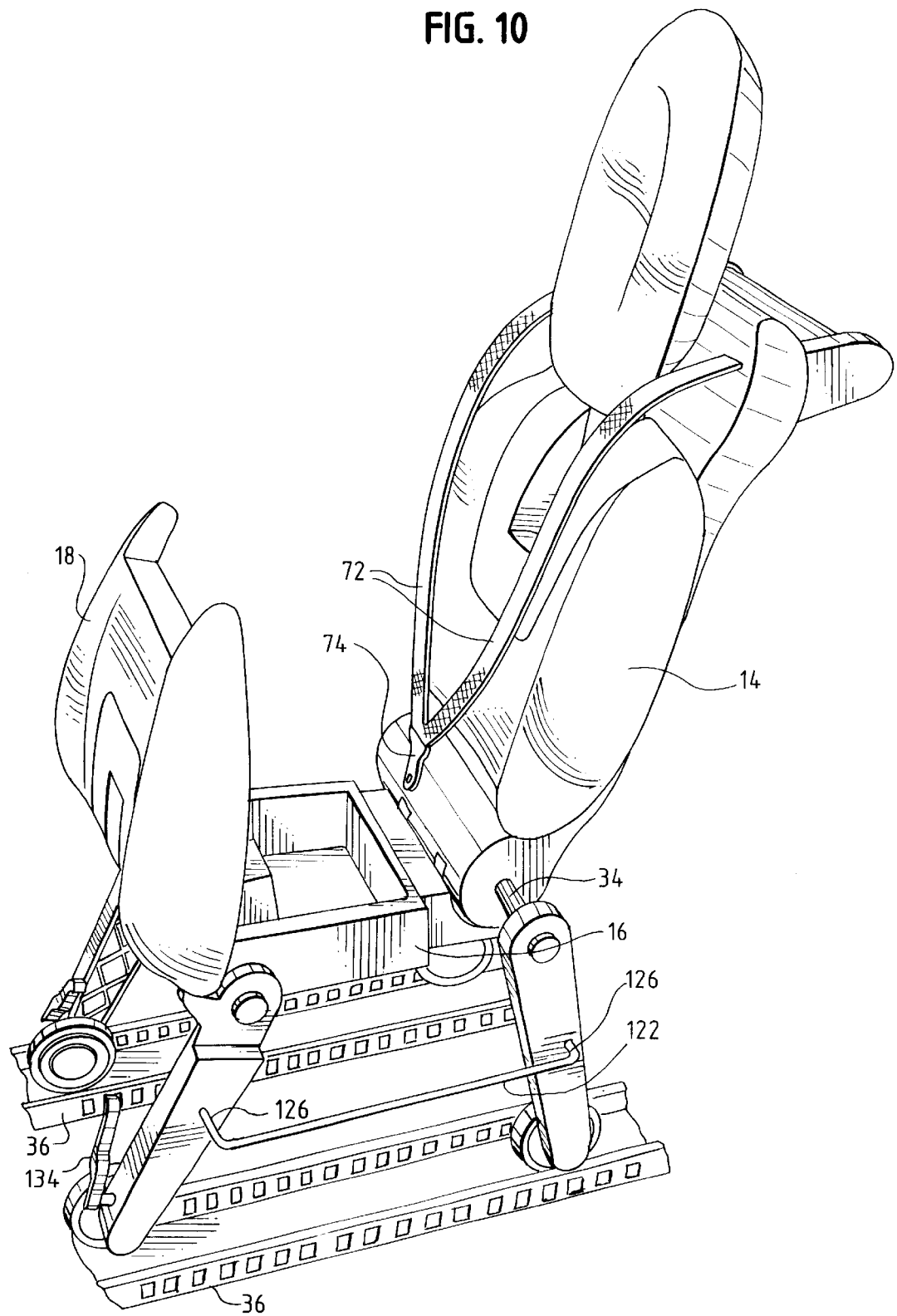
FIG. 10 is a perspective view of a specific embodiment of front and rear arms and a crossbrace.

Preferably, however, both sets of wheels may fit within the width of the floor board seat tracks 36 depending upon the dimensions of the floor board seat tracks and the thickness of the front and rear arms 22, 24. Such an arrangement is shown in FIGS. 9B and 10 where both sets of wheels 28, 30 and the front and rear arms 22, 24 fit within the width of the floor board seat tracks 36.

Figure 9C:
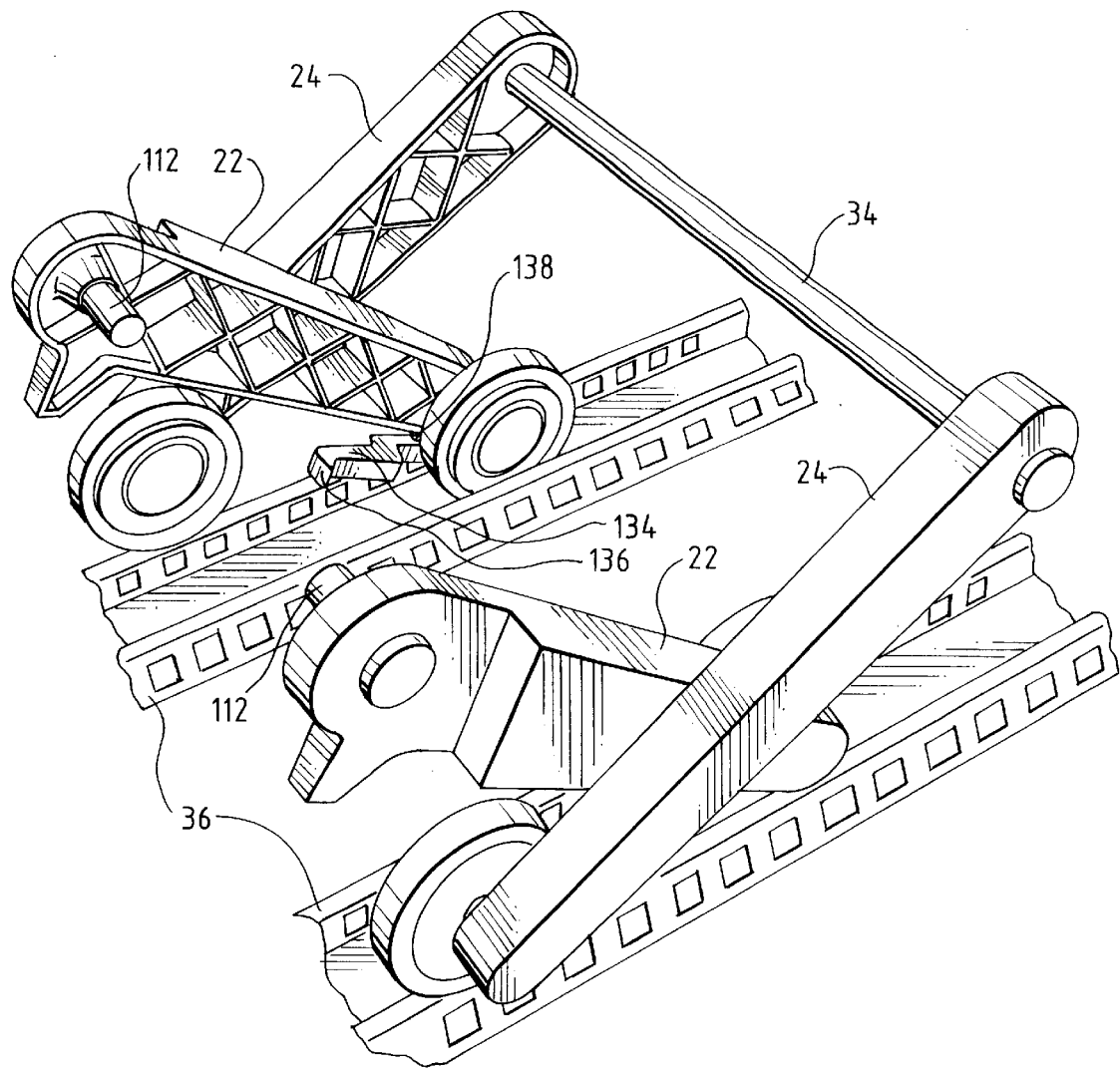

FIG. 9B shows the apparatus 10 as the front and rear arms 22, 24 just begin to extend. As the arms 22, 24 begin to unfold or outwardly pivot, the front wheels 28 move closer to the rear wheels 30. FIG. 9C shows further extension of the front and rear arms 22, 24, while FIG. 9D shows the front and rear arms 22, 24 in the fully extended position. Note that between the movements illustrated in FIGS. 9C and 9D, the arms 22, 24 "uncross" and the front and rear wheels 28, 30 pass each other along the floor board seat tracks 36. A similar sequence is also shown in FIGS. 7A–7C where FIG. 7C shows the apparatus 10 with the front and rear arms 22, 24 in the fully extended position and ready for use as a stroller external to the vehicle.

To lock the front and rear arms 22, 24 in the fully extended position or stroller mode so that the stroller apparatus does not collapse, the hollow cylindrical sleeve 110 within the upright body portion 12 may include a ratchet mechanism or a lock stop (not shown) so as to permit the axle 34 to lock in place when rotated to a fully counter-clockwise position. When the axle 34 is fully rotated in the counter-clockwise direction, the rear arms 24 attached thereto pivot and extend so that they are generally at about a thirty degree angle relative to the plane of the bottom body portion, as shown by the arc labeled 121 in FIG. 9D.

Of course, the front and rear arms 22, 24 may be designed to deploy at a ninety degree angle relative to the plane of the bottom body portion 16 when fully extended, but a thirty degree angle is deemed to be a more stable configuration. When the axle 34 is fully rotated so that the rear arms 24 are extended, the ratchet mechanism may rotationally lock the axle 34 inside the hollow cylindrical sleeve 110. Alternatively, a locking recess (not shown) disposed within the hollow cylindrical sleeve 110, and a corresponding locking tab (not shown) disposed on the axle 34 may prevent rotation beyond the thirty degree point, thus locking the rear arms 24 and preventing collapse of the stroller. Preferably, a spring release button (not shown) may be used to release the ratchet mechanism to permit the rear arms 24 to pivot and fold inwardly into the seat position.

A similar ratchet mechanism may be provided so as to lock the front arms 22 in the fully extended position or stroller mode. For example, the lateral sidewall 120 of the bottom body portion 16 may also include hollow metal cylindrical sleeves 121A configured to receive and releasably lock the posts 112 corresponding to the front arms 22.

Alternatively, as shown in FIG. 10 (and also shown in FIG. 9B) a cross-brace 122 may be operatively coupled between the front arms 22 and the rear arms 24 to lock the arms in place relative to each other when the apparatus 10 is in the stroller mode. The cross-brace 122 may be formed of tubular metal, or may be a substantially flat beam. The cross-brace 122 may be received with apertures 126 disposed toward the proximal ends of each of the arms 22, 24 so as to add rigidity to the front and rear arms.

Figure 11:
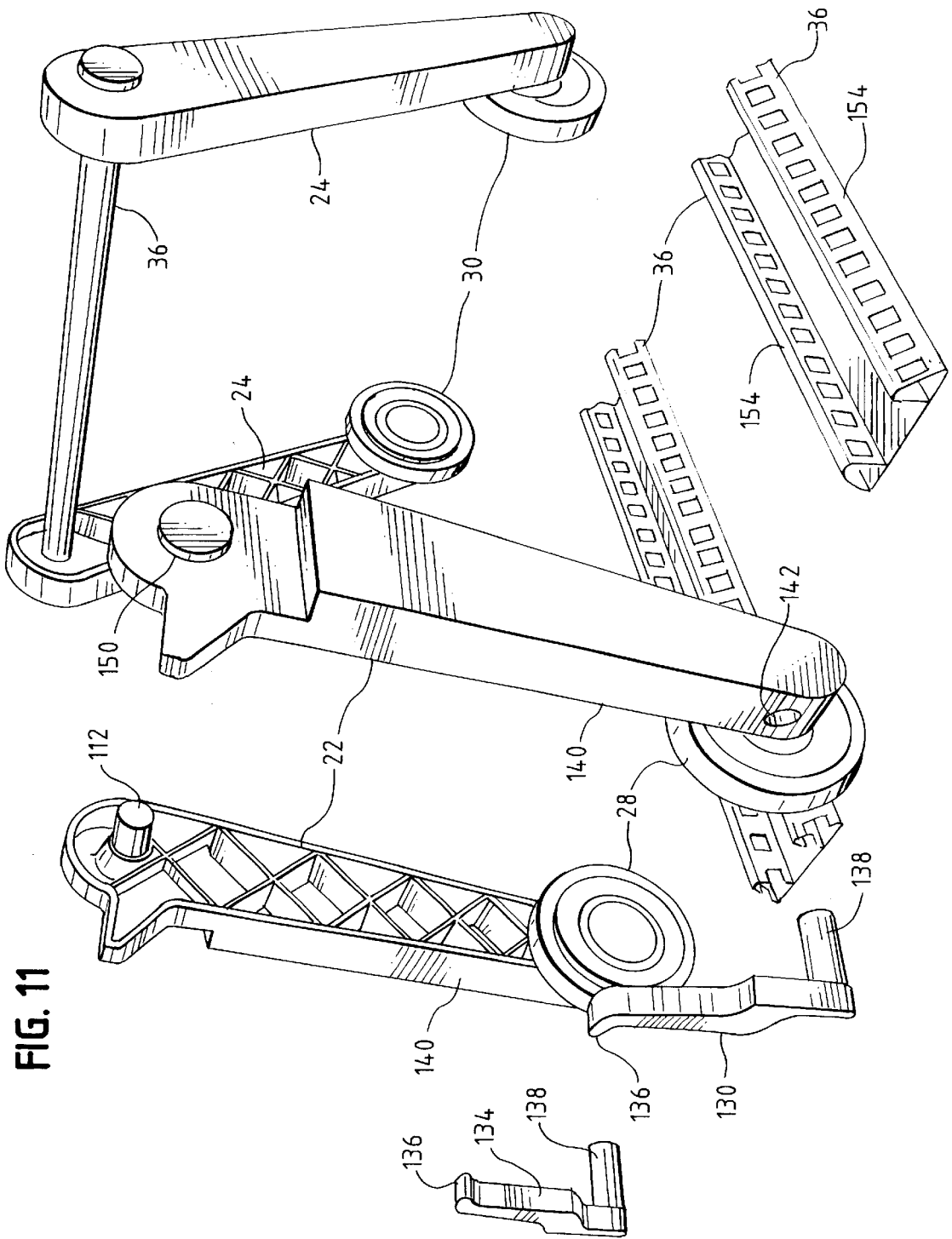
FIG. 11 is similar to FIG. 9D and shows additional detail of a locking hook.
Figure 12:
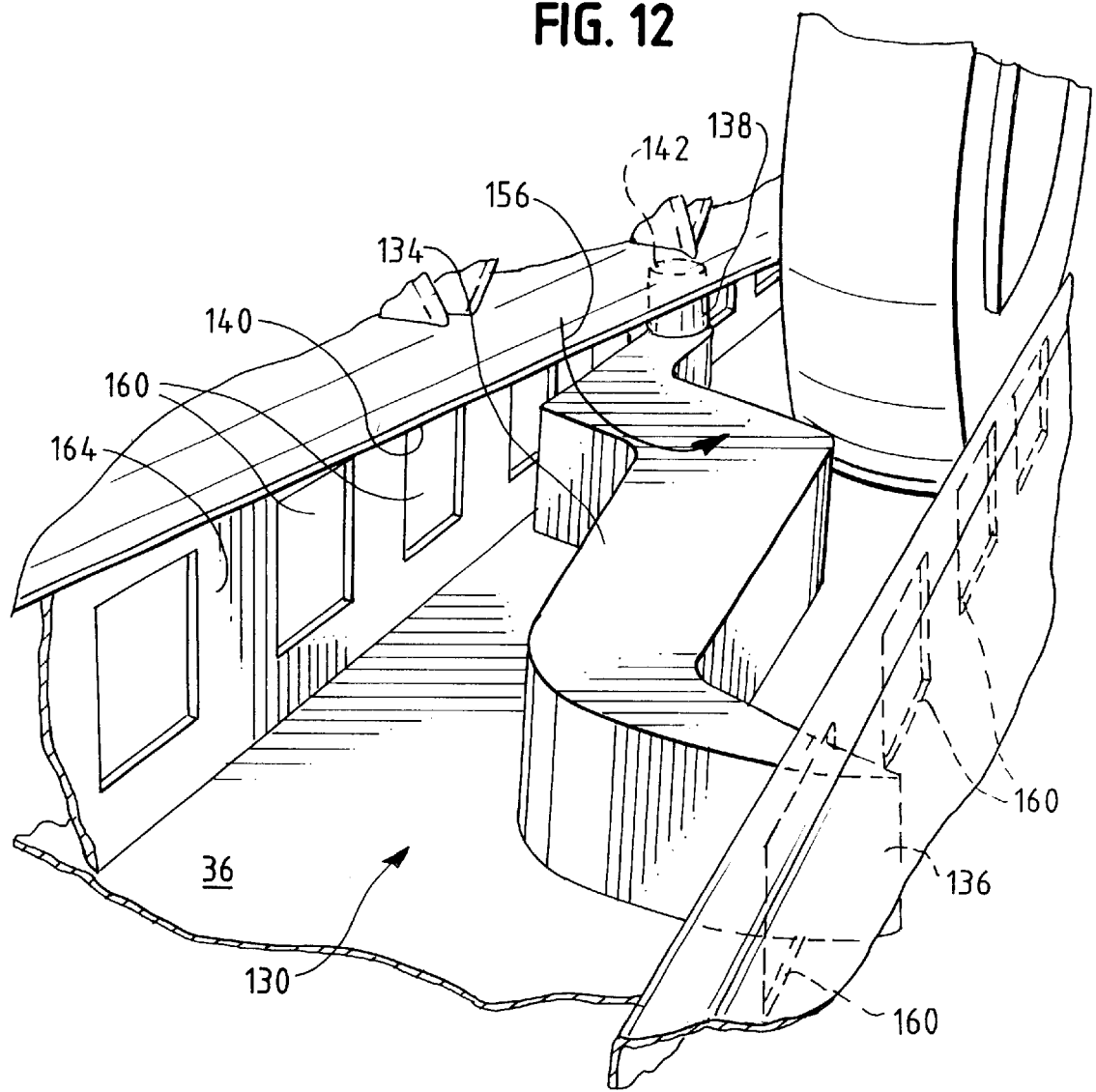
FIG. 12 is an enlarged prospective view of one of the front arms and the locking hook of FIG. 9 taken generally along the line 10—10.

Referring now to FIGS. 11 and 12, seat a locking mechanism 130 is shown. The seat locking mechanism 130 may secure the apparatus 10 to the floor board seat tracks 36 when the apparatus is in the seat mode and the arms 22, 24 are fully pivoted inwardly, which seat mode position is also shown in FIG. 9A. In one specific embodiment, each of the forward arms 22 may include the locking mechanism 130, but alternatively, all four arms 22, 24 may include the locking mechanism depending upon whether both the front and the rear arms fit within the width of the floor board seat tracks 36. The locking mechanism 130 may include a hook body 134, an engagement hook 136 that terminates the hook body, and a spindle 138 disposed perpendicular to the face of the hook body.

The hook body 134 may rotatably attached to a forward face 140 of the front arm 22 by the spindle 138, which spindle is preferably received within a socket 142 formed within the front arm 22. Alternatively, the spindle 138 may be threaded and may receive a locking nut that permits the spindle to freely rotate through an angle of about twenty degrees. Accordingly, the hook body 134 may also rotate through the same arc. A spring-assisted lock engagement button 150 may be disposed at a suitably convenient location on the front arm 22 to cause the hook body 134 to rotate from a locked position, shown in FIGS. 9A and 12, to an unlocked position, shown in FIG. 9C. The engagement button 150 may be operatively coupled to the locking mechanism via a linkage (not shown) in the front arms.

When rotated into the locking position as best shown in FIG. 12, the hook body 134 rotates about the spindle 138 in a direction shown by an arc labeled as 156. This causes the engagement hook 136 to partially penetrate and engage one of the plurality of track slots 160, which may be preferably evenly distributed along both upright sidewalls 154 of the floor board seat tracks 36. Note that for purposes of clarity, the slots 160 are not always shown disposed on both sidewalls 154 of the seat tracks. Rotational spring pressure on the hook body 134 urges the engagement hook 136 into the track slots 160, thus locking the apparatus 10 to the floor board seat tracks when in the seat mode. Depression of the engagement button 150 releases the spring pressure, thus permitting the hook body 134 to rotate such that the engagement hook 136 withdraws from the track slot 160, as also shown in FIGS. 9C and 9D.

Specific embodiments of a combination vehicle passenger seat/child stroller apparatus according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

What is claimed is:

1. A combination vehicle passenger seat/child stroller apparatus adapted to be releasably secured to floor-board seat tracks of a vehicle, the apparatus selectively convertible between a stroller mode for use outside the vehicle and a seat mode for supporting an adult or child passenger inside the vehicle, the apparatus comprising:

an upright body portion and a corresponding first cushion;

a bottom body portion and a corresponding second cushion, the bottom body portion operatively coupled to the upright body portion;

the bottom body portion being hollow and including an open end configured to be releasably covered by the second cushion so as to define a chamber for storage of articles;

a pivoting cushion operatively attached to the upright body portion and configured to pivot between a lower position, and an upper position adapted to accommodate an adult passenger;

front wheels and rear wheels;

front arms and rear arms each having proximal and distal ends, the arms configured to support the upright body portion and the bottom body portion;

the distal ends of the front arms operatively connected to the front wheels and the distal ends of the rear arms operatively connected to the rear wheels;

the proximal ends of the arms pivotally connected to at least one of the upright body portion and the bottom body portion;

the front and rear arms configured to pivot and fold inwardly such that in the seat mode, at least one of the front and rear arms configured to secure the apparatus to the seat tracks of the vehicle; and the front and rear arms configured to pivot and extend outwardly to permit use as a child stroller external to the vehicle.

2. The apparatus of claim 1 wherein the upright body portion includes a seatbelt having a tongue portion, and the bottom body portion includes a clasp configured to receive the tongue portion and releasably secure the seat belt.

3. The apparatus of claim 2 wherein the seatbelt is a V-type seat belt that fastens between the legs of the passenger.

4. The apparatus of claim 2 wherein when in the stroller mode, the seatbelt is configured to restrain and secure the child between the upright and bottom body portions.

5. The apparatus of claim 1 wherein when pivoted in the lower position, the pivoting cushion is a backrest disposed forward of the first cushion to increase an effective thickness of the first cushion so as to accommodate a child passenger.

6. The apparatus of claim 1, wherein the second cushion is pivotally attached to the bottom body portion so as to provide access to the chamber.

7. The apparatus of claim 1 wherein in the seat mode, at least one of the front and rear arms are configured to lock the apparatus to floor board seat tracks of the vehicle.

8. The apparatus of claim 1 further including a hook engagement portion attached to at least one of the front and rear arms, when in the seat mode, the hook engagement portion configured to releasably secure the apparatus to the floor-board seat tracks.

9. The apparatus of claim 1 wherein at least one of the front and rear arms lock in the extended position to permit use as the stroller.

10. The apparatus of claim 1 further including a cross brace operatively coupled to at least one of the front arms and rear arms to releasably lock the front arms and rear arms in a fixed position to facilitate use as the stroller.

11. The apparatus of claim 1 wherein the first cushion is identical to the second cushion and interchangeable therewith.

12. A combination vehicle passenger seat/child stroller apparatus adapted to be releasably secured to floor-board seat tracks of a vehicle, the apparatus selectively convertible between a stroller mode for use outside the vehicle and a seat mode for supporting an adult or child passenger inside the vehicle, the apparatus comprising:

an upright body portion and a corresponding first cushion;

a body portion and a corresponding second cushion, the bottom body portion operatively coupled to the upright body portion;

the bottom body portion being hollow and including an open end configured to be releasably covered by the second cushion so as to define a chamber for storage of articles;

front wheels and rear wheels;

front arms and rear arms each having proximal and distal ends, the arms configured to support the upright body portion and the bottom body portion;

the distal ends of the front arms operatively connected to the front wheels and the distal ends of the rear arms operatively connected to the rear wheels;

the proximal ends of the arms pivotally connected to at least one of the upright body portion and the bottom body portion;

the front and rear arms configured to pivot and fold inwardly such that in the seat mode, at least one of the front and rear arms configured to secure the apparatus to the seat tracks of the vehicle; and the front and rear arms configured to pivot and extend outwardly to permit use as a child stroller external to the vehicle.

13. The apparatus of claim 12 further including a pivoting cushion operatively attached to the upright body portion and configured to pivot between an upper position and a lower position.

14. The apparatus of claim 12 wherein when pivoted in the upper position, the pivoting cushion is a headrest configured to accommodate an adult passenger.

15. The apparatus of claim 12 wherein the seat mode, at least one of the front and rear arms are configured to lock the apparatus to floor board seat tracks of the vehicle.

16. The apparatus of claim 12 further including a hook engagement portion attached to at least one of the front and rear arms, when in the seat mode, the hook engagement portion configured to reasonably secure the apparatus to the floor-board seat tracks.

17. The apparatus of claim 12 wherein the first cushion is identical to the second cushion and interchangeable therewith.

18. A combination vehicle passenger seat/child stroller apparatus adapted to be releasably secured to floor-board seat tracks of a vehicle, the apparatus selectively convertible between a stroller mode for use outside the vehicle and a seat mode for supporting an adult or child passenger inside the vehicle, the apparatus comprising:

an upright body portion and a corresponding first cushion;

a bottom body portion and a corresponding second cushion, the bottom body portion operatively coupled to the upright body portion;

front wheels and rear wheels;

front arms and rear arms each having proximal and distal ends, the arms configured to support the upright body portion and the bottom body portion;

the distal ends of the front arms operatively connected to the front wheels and the distal ends of the rear arms operatively connected to the rear wheels;

the proximal ends of the arms pivotally connected to at least one of the upright body portion and the bottom body portion;

the front and rear arms configured to pivot and fold inwardly such that in the seat mode, at least one of the front and rear arms configured to secure the apparatus to the seat tracks of the vehicle;

the front and rear arms configured to pivot and extend outwardly to permit use as a child stroller external to the vehicle; and a cross brace operatively coupled to at least one of the front arms and rear arms to releasably lock the front arms and rear arms in a fixed position to facilitate use as the stroller.

19. The apparatus of claim 18 wherein the bottom body portion is hollow and includes an open end configured to be releasably covered by the second cushion so as to define a chamber for storage of articles.

* * * * *